US010034479B2

(12) United States Patent
Hall

(10) Patent No.: US 10,034,479 B2
(45) Date of Patent: Jul. 31, 2018

(54) AGITATOR AND DUAL AGITATOR ASSEMBLY FOR USE WITH INDUSTRIAL MIXERS

(71) Applicant: SHAFFER MANUFACTURING CORPORATION, Urbana, OH (US)

(72) Inventor: Michael W. Hall, Sidney, OH (US)

(73) Assignee: SHAFFER MANUFACTURING CORPORATION, Urbana, OH (US)

(*) Notice: Subject to any disclaimer, the term of this patent is extended or adjusted under 35 U.S.C. 154(b) by 340 days.

(21) Appl. No.: 14/989,160

(22) Filed: Jan. 6, 2016

(65) Prior Publication Data

US 2017/0071215 A1    Mar. 16, 2017

Related U.S. Application Data

(60) Provisional application No. 62/216,740, filed on Sep. 10, 2015.

(51) Int. Cl.
| | | |
|---|---|---|
| *B01F 7/00* | (2006.01) | |
| *A21C 1/14* | (2006.01) | |
| *A21C 1/06* | (2006.01) | |
| *B01F 7/08* | (2006.01) | |

(52) U.S. Cl.
CPC .............. *A21C 1/141* (2013.01); *A21C 1/06* (2013.01); *B01F 7/00133* (2013.01); *B01F 7/00425* (2013.01); *B01F 7/00975* (2013.01); *B01F 7/085* (2013.01); *B01F 2215/0011* (2013.01)

(58) Field of Classification Search
USPC ........................................ 366/320, 301, 353
See application file for complete search history.

(56) References Cited

U.S. PATENT DOCUMENTS

| 540,962 | A | * | 6/1895 | Duhkop | ................. B01F 7/042 |
|---|---|---|---|---|---|
| | | | | | 271/8.1 |
| 907,748 | A | * | 12/1908 | Darling | ..................... A23G 4/06 |
| | | | | | 366/97 |
| 4,733,607 | A | * | 3/1988 | Star | ...................... B01F 7/00208 |
| | | | | | 366/149 |
| 4,859,074 | A | * | 8/1989 | Asai | ........................ B29B 7/186 |
| | | | | | 366/300 |
| 5,083,506 | A | * | 1/1992 | Horn | ....................... B01F 7/081 |
| | | | | | 366/149 |
| 5,228,775 | A | * | 7/1993 | Horn | ....................... B01F 7/088 |
| | | | | | 366/278 |
| 5,230,561 | A | * | 7/1993 | Nishimi | ................... B29B 7/186 |
| | | | | | 366/297 |
| 5,292,186 | A | * | 3/1994 | Kubo | ................... B29C 47/6056 |
| | | | | | 366/298 |
| 5,299,865 | A | * | 4/1994 | Presnell | ................... B01F 7/081 |
| | | | | | 366/300 |

(Continued)

*Primary Examiner* — Mark Halpern
(74) *Attorney, Agent, or Firm* — Frost Brown Todd LLC

(57) ABSTRACT

An agitator assembly for use with industrial mixers that includes at least two rotating agitators, wherein each rotating agitator includes an agitator shaft, wherein the agitator shaft defines an axis of rotation extending from a first end of the agitator shaft to a second end of the agitator shaft; and first, second, and third sweep blades mounted on the agitator shaft, wherein the pitch angle of each sweep blade relative to the axis of rotation of the agitator shaft is between 30-60°; and wherein the rotating agitators rotate in opposite directions relative to one another when the assembly is in use.

18 Claims, 4 Drawing Sheets

(56) References Cited

U.S. PATENT DOCUMENTS 5,549,384 A * 8/1996 Reynolds ................ B01F 7/161
                                                    366/143
5,897,206 A * 4/1999 Hall ........................ B01F 7/081
                                                    366/300

* cited by examiner

AGITATOR AND DUAL AGITATOR ASSEMBLY FOR USE WITH INDUSTRIAL MIXERS

CROSS-REFERENCE TO RELATED APPLICATIONS

This patent application claims the benefit of U.S. Provisional Patent Application Ser. No. 62/216,740 filed on Sep. 10, 2015, and entitled "Agitator and Agitator Assembly for Use with Industrial Mixers", the disclosure of which is hereby incorporated by reference herein in its entirety and made part of the present U.S. utility patent application for all purposes.

BACKGROUND OF THE INVENTION

The described invention relates in general to an agitator, and more specifically to an agitator and dual agitator assembly for use in large industrial and commercial mixers used for mixing viscous materials such as cookie dough. The agitator and dual agitator assembly of the present invention provide rapid and uniform mixing of dough or other materials within the mixing bowl of an industrial or commercial mixer.

Certain known agitator assemblies for use in large-scale mixers include a pair of agitator shafts having a set of sweep blades mounted thereon. The rotation of the agitator shafts in these prior art systems often creates certain mixing discontinuities because the flow of material in the vicinity of the agitator assembly tends to be focused at the center of the agitator assembly. Accordingly, material at the periphery of a mixing bowl in which such an agitator assembly is positioned is often under-mixed and material at the center of such a mixing bowl is over-mixed. This non-uniform flow of material is not conducive to an efficient and rapid mixing operation. Thus, there is an ongoing need for an agitator and an agitator assembly that ensures that materials are mixed uniformly throughout the mixing bowl and there is also a need for an agitator design that improves mixing rates within a mixing bowl.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first agitator assembly for use with industrial mixers is provided. This agitator assembly includes at least two rotating agitators, wherein each rotating agitator includes an agitator shaft, wherein the agitator shaft defines an axis of rotation extending from a first end of the agitator shaft to a second end of the agitator shaft; and first, second, and third sweep blades mounted on the agitator shaft, wherein the pitch angle of each sweep blade relative to the axis of rotation of the agitator shaft is between 30-60°; and wherein the rotating agitators rotate in opposite directions relative to one another.

In accordance with another aspect of the present invention, a second agitator assembly for use with industrial mixers is provided. This agitator assembly includes at least two rotating agitators, wherein each rotating agitator includes an agitator shaft, wherein the agitator shaft defines an axis of rotation extending from a first end of the agitator shaft to a second end of the agitator shaft; first, second, third, and fourth hubs mounted on the agitator shaft at predetermined locations, wherein the distances between the first and second hub, the second and third hub, and third and fourth hub are substantially equal; a first sweep blade mounted between the first hub and second hub; a second sweep blade mounted between the second hub and third hub; and a third sweep blade mounted between the third and fourth hub; wherein the pitch angle of each sweep blade relative to the axis of rotation of the agitator shaft is between 30-60°, wherein the rotating agitators rotate in opposite directions relative to one another when in use, and wherein the agitator assembly is adapted for use in a mixing bowl.

In yet another aspect of this invention, a third agitator assembly for use with industrial mixers is provided. This agitator assembly includes at least two rotating agitators, wherein each rotating agitator includes an agitator shaft, wherein the agitator shaft defines an axis of rotation extending from a first end of the agitator shaft to a second end of the agitator shaft; first, second, third, and fourth hubs mounted on the agitator shaft at predetermined locations, wherein the distances between the first and second hub, the second and third hub, and third and fourth hub are substantially equal; a first sweep blade mounted between the first hub and second hub, wherein the first sweep blade is oriented with a forward sweep directionality; a second sweep blade mounted between the second hub and third hub, wherein the second sweep blade is oriented a forward sweep directionality; and a third sweep blade mounted between the third and fourth hub, wherein the third sweep blade includes a first section that is oriented with a forward sweep directionality and a second section that is oriented with a reverse sweep directionality; wherein the pitch angle of each sweep blade relative to the axis of rotation of the agitator shaft is fixed between about 30-60° and preferably at 45°, wherein the rotating agitators rotate in opposite directions relative to one another when in use, wherein the agitator assembly is adapted for use in a mixing bowl, and wherein the mixing bowl is a component of a large-scale industrial mixer.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
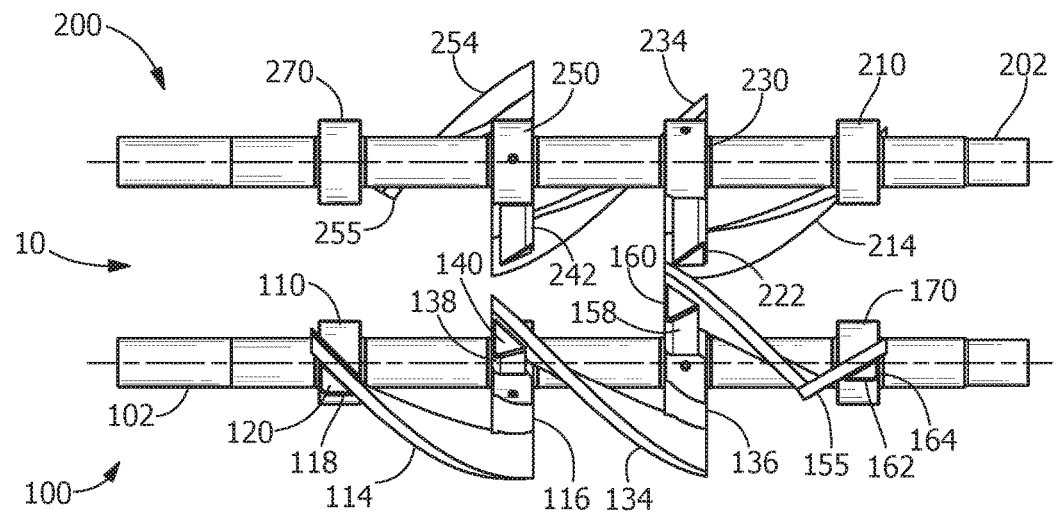
FIG. 1 is a top view of a dual or double arm agitator assembly in accordance with an exemplary embodiment of the present invention showing the position of the dual agitators relative to one another.
Figure 2:
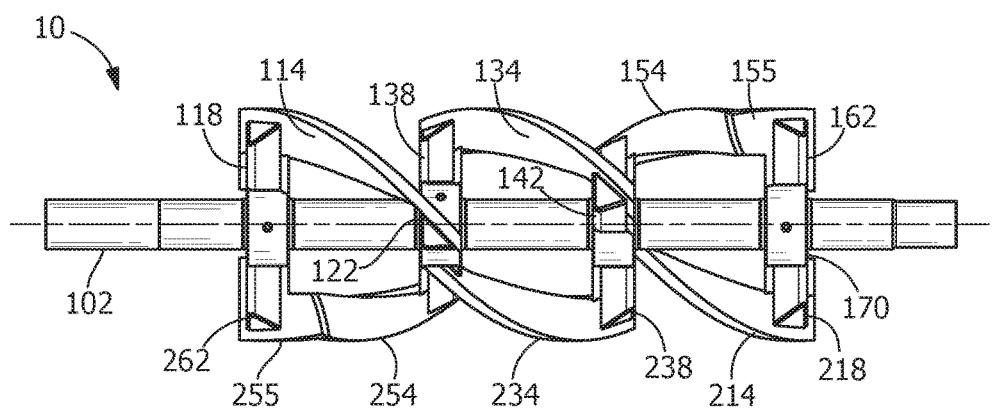
FIG. 2 is a side view of the agitator assembly of FIG. 1.
Figure 3:
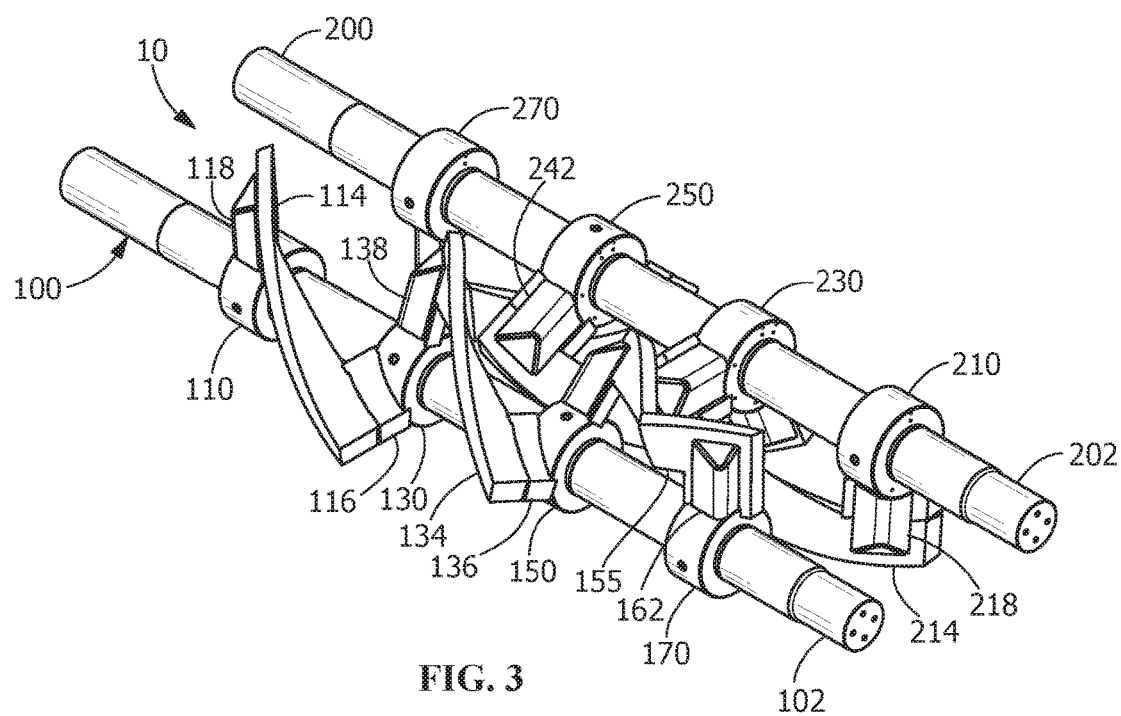
FIG. 3 is a perspective view of the agitator assembly of FIG. 1.
Figure 4:
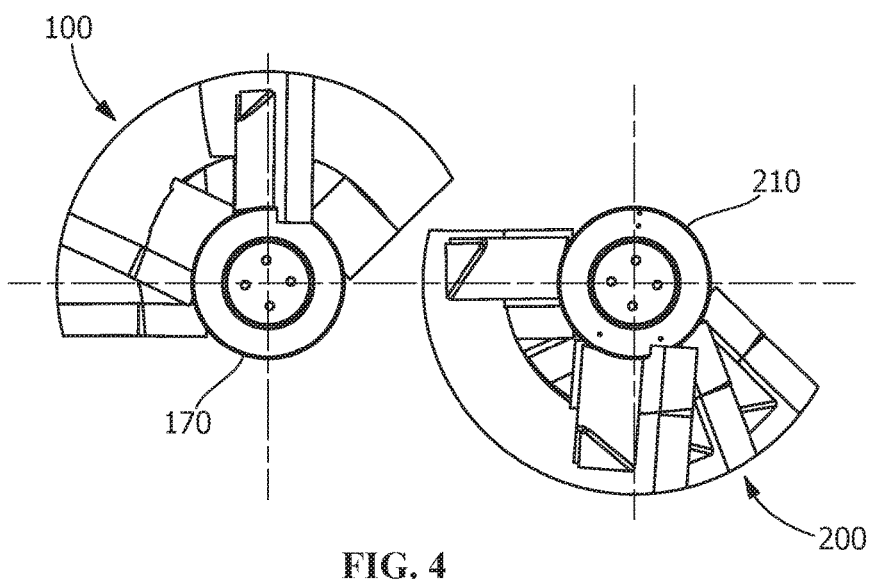
FIG. 4 is an end view of the agitator assembly of FIG. 1.
Figure 5:
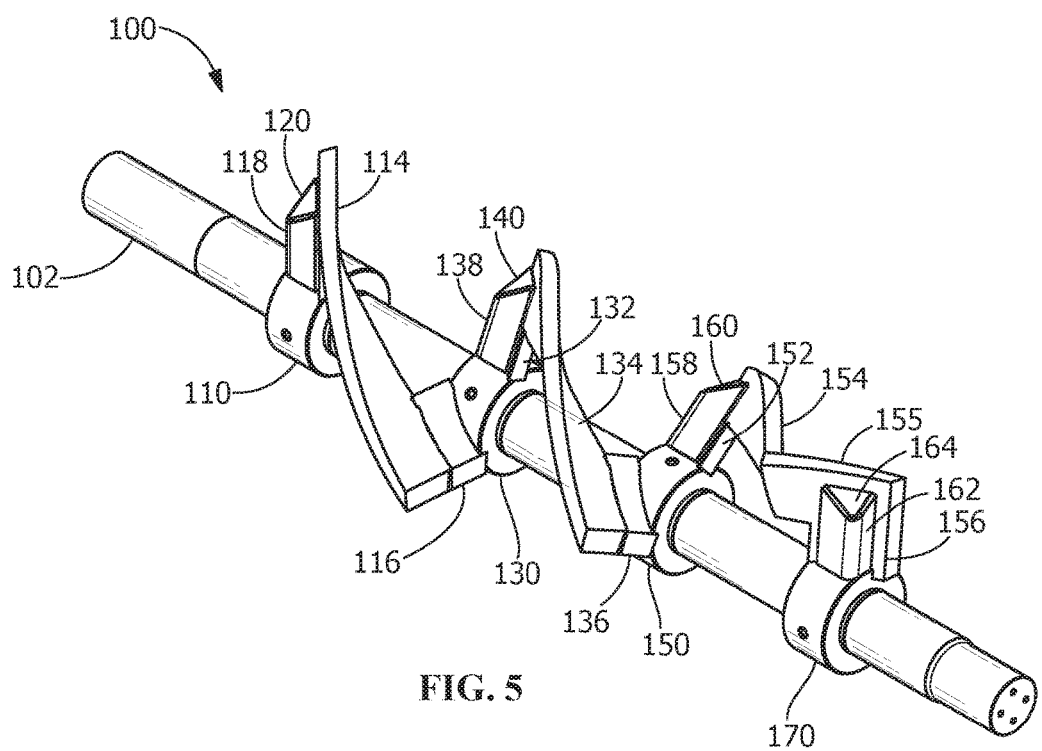
FIG. 5 is a perspective view of one of the individual agitator arms of the dual agitator assembly of FIG. 1.
Figure 6:
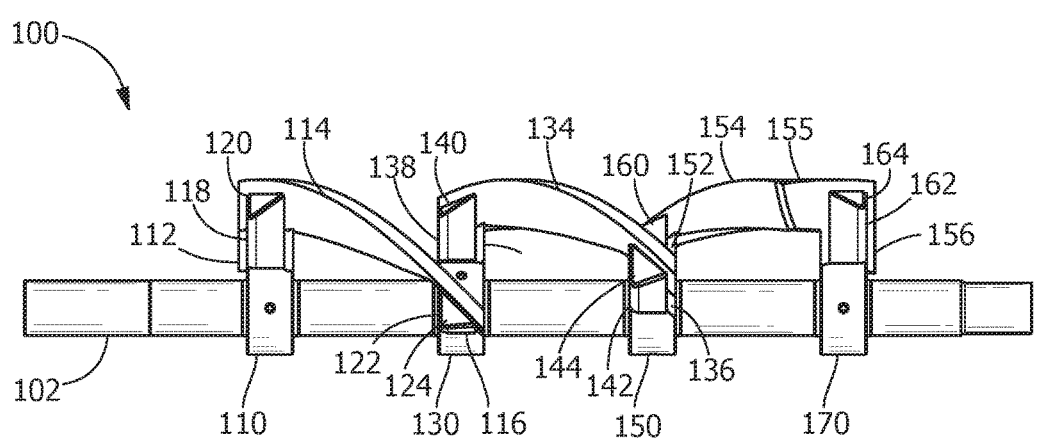
FIG. 6 is side view of one of the individual agitator arms of the dual agitator assembly of FIG. 1.
Figure 7:
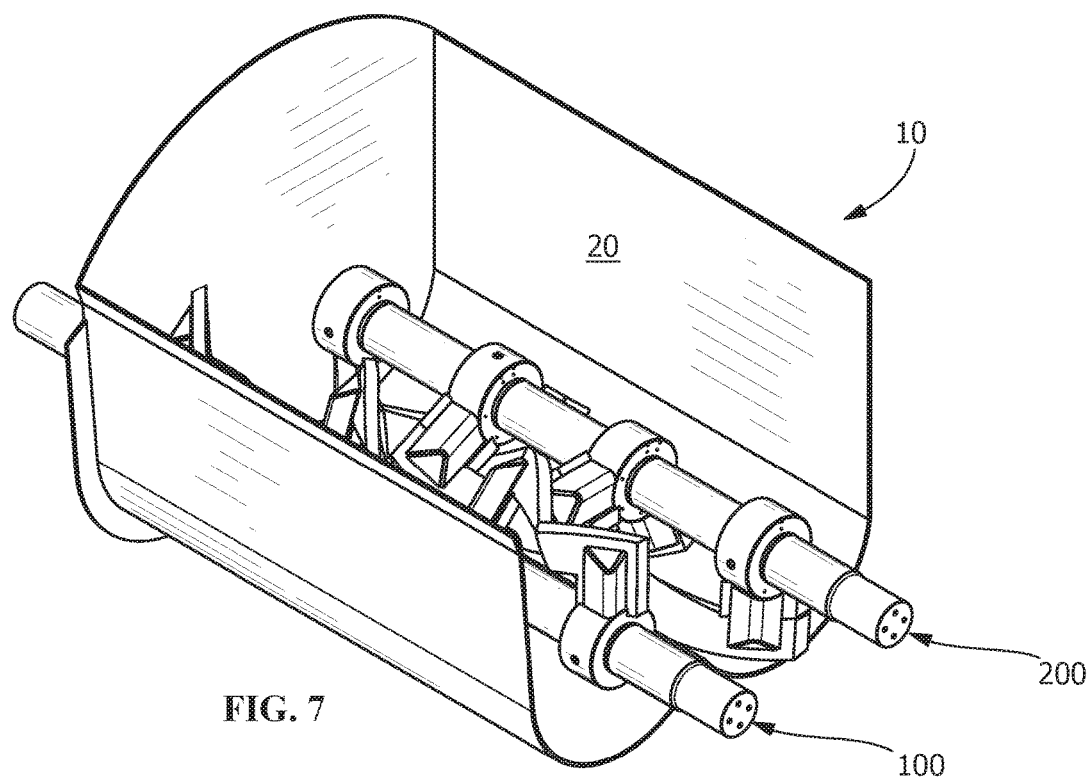
FIG. 7 is a perspective view of the dual agitator assembly of FIG. 1 properly positioned within the mixing bowl of an industrial mixer.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates in general to an agitator, and more specifically to an agitator and dual agitator assembly for use in large industrial or commercial mixers used for mixing large volumes (e.g., 100-5000 pounds) of viscous materials such as cookie dough. The agitator and dual agitator assembly of the present invention provide rapid and uniform mixing of dough within a mixing bowl. The dual agitator assembly of this invention includes an advanced swept-blade design that creates a substantially circuitous flow pattern within the mixing bowl and that provides significant improvement over prior art designs with regard to uniformity of mixing. Each of the agitators in the dual agitator assembly of the present invention typically includes three individual mixing blades in each separate blade component that is mounted on each agitator arm rather than two mixing blades, which is common in prior art systems. In the embodiments shown in the Figures, the pitch of the mixing blades is typically fixed at 45° relative to the rotating axis of the agitator arm on which the blades are mounted, although other angles are possible.

Figure 8:
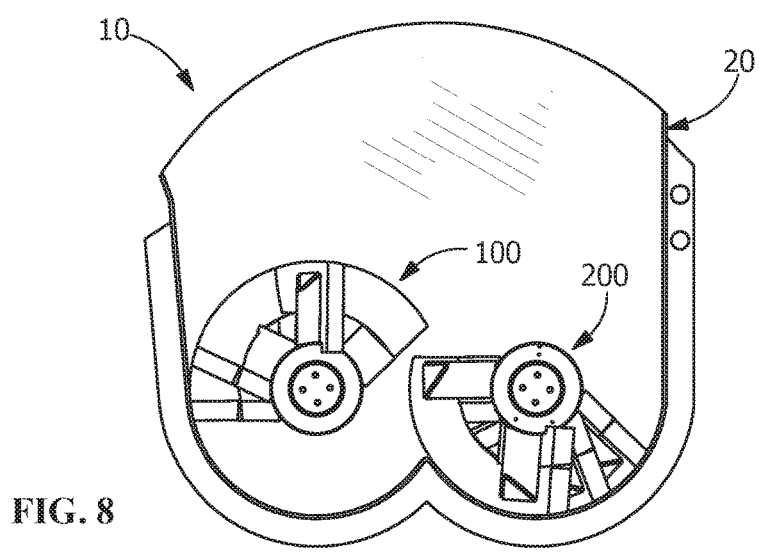
FIG. 8 is an end view of the agitator assembly of FIG. 7.

With reference to FIGS. 1-8, an exemplary embodiment of dual agitator system or dual agitator assembly 10 includes first agitator 100 and second agitator 200, which are rotatably mounted within mixing bowl 20. The general construction of first and second agitators 100 and 200 is the same; however, when mounted in mixing bowl 10, second agitator 200 is mounted in an opposite orientation relative to first agitator 100. In other words, second agitator 200 is flipped 180° relative to first agitator 100. This arrangement results in first agitator 100 moving the material being mixed in a direction opposite the direction in which second agitator 200 is moving the material, thereby resulting in extremely thorough mixing of the material. As shown in FIG. 8, when mounted in mixing bowl 10, first agitator 100 is mounted slightly above second agitator 200, which results in the material being mixed moving upward and downward in addition to moving left to right and right to left. Accordingly, the material being mixed is thoroughly circulated through mixing bowl 10.

First agitator 100 includes first hub 110, second hub 130, third hub 150, and fourth hub 170, all mounted on agitator shaft 102. Three agitator blade components are mounted between the four hubs. The first agitator blade component includes first leg 112; first agitator blade 114, which is mounted in a forward sweep directionality; second leg 116; first support 118 (mounted on first leg 112), which includes cap 120; and second support 122 (mounted on second leg 122), which includes cap 124. The second agitator blade component includes third leg 132; second agitator blade 134, which is mounted in a forward sweep directionality; fourth leg 136; third support 138 (mounted on third leg 132), which includes cap 140; and fourth support 142 (mounted on fourth leg 136), which includes cap 144. The third agitator blade component includes fifth leg 152; first section of third agitator blade 154, which is mounted in a forward sweep directionality; second section of third agitator blade 155, which is mounted in a reverse directionality; sixth leg 156; fifth support 158 (mounted on fifth leg 152), which includes cap 160; and sixth support 162 (mounted on sixth leg 156), which includes cap 164.

Second agitator 200 includes first hub 210, second hub 230, third hub 250, and fourth hub 270, all mounted on agitator shaft 202. Three agitator blade components are mounted between the four hubs. The first agitator blade component includes first leg 212; first agitator blade 214, which is mounted in a forward sweep directionality; second leg 216; first support 218 (mounted on first leg 212), which includes cap 220; and second support 222 (mounted on second leg 222), which includes cap 224. The second agitator blade component includes third leg 232; second agitator blade 234, which is mounted in a forward sweep directionality; fourth leg 236; third support 238 (mounted on third leg 232), which includes cap 240; and fourth support 242 (mounted on fourth leg 236), which includes cap 244. The third agitator blade component includes fifth leg 252; first section of third agitator blade 254, which is mounted in a forward sweep directionality; second section of third agitator blade 255, which is mounted in a reverse directionality; sixth leg 256; fifth support 258 (mounted on fifth leg 252), which includes cap 260; and sixth support 262 (mounted on sixth leg 256), which includes cap 264.

In exemplary embodiments of the present invention, the mixing blade pitch angle is substantially the same for all mixing blades mounted on the same agitator, as well as for all agitators being used in the mixing bowl, regardless of mixer size. As previously indicated, the pitch of the mixing blades may be fixed at 45° relative to the rotating axis of the agitator arm on which the blades are mounted; however, alternate embodiments include blade pitch angles of 30-60° relative to the rotating axis of the agitator arm on which the blades are mounted. A constant blade pitch angle used with various mixer sizes results in consistent mixing action within such mixers. The steeper pitch angle of the present invention (relative to prior designs that include pitch angles of 31 and 40°) incorporates individual ingredients within dough mixtures in shorter periods of time resulting in an overall decrease in required mixing time. Steeper pitch angles and shorter mixing times also incorporate fragile particulates in dough mixers more rapidly resulting in less damage to such particulates and an overall higher quality final product. Faster mix times also result in energy savings per batch of dough or other material.

The mixing blades of this invention, which are typically stainless steel (as are the other components), include a smooth sweep transition from vertical blade to vertical blade. The total length of each mixing blade varies for different mixer sizes (i.e., capacities). By way of example, the length range for each mixing blade may be about 20 inches by about 74 inches. The diameter of each mixing blade also varies for different mixer sizes. By way of example, the diameter range may be about 7 inches to about 36 inches. To physically obtain a smooth sweep transition while maintaining a constant blade pitch angle for the different agitator length and diameter combinations, the number of sweep blades and the vertical blade offset angle may be varied. Tables 1 and 2, below: (i) provide information regarding agitator design standards and list actual values for use with standard mixer product lines and; (ii) provide instructions for determining various relevant design aspects.

TABLE 1

Agitator Design Standards

| DESIGN GROUP | EAGLE | EAGLE | | DG100/150 | | DG200/250 | | | |
|---|---|---|---|---|---|---|---|---|---|
| MODEL | EDA25 | EDA70 | EDA100 | DA100 | DA150 | DA100HD3 | DA150HD2 | DA200 | DA250 |
| STD AGITATOR TYPE | 2 SWEEP | 2 SWEEP | 2 SWEEP | 2 SWEEP | 2 SWEEP | 2 SWEEP | 2 SWEEP | 2 SWEEP | 2 SWEEP |
| BOTTOM RADIUS | 6.500 | 9.000 | 11.000 | 11.000 | 11.000 | 12.000 | 12.000 | 13.000 | 13.000 |
| BOWL INSIDE LENGTH | 20.000 | 27.000 | 32.000 | 32.000 | 38.000 | 30.000 | 36.000 | 40.000 | 48.000 |
| NUMBER OF SWEEPS | | 2 | 2 | 2 | 2 | 2 | 2 | 2 | 2 |
| HUB TO BOWL END | | 1.000 | 1.000 | 1,000 | 1.000 | 1.000 | 1.000 | 1.000 | 1.000 |
| HUB CENTERS | | 11.000 | 13.500 | 12.750 | 15.750 | 11.500 | 14.500 | 16.500 | 20.500 |
| BETWEEN HUBS | | 8.000 | 10.500 | 8.250 | 11.250 | 6.500 | 9.500 | 11.500 | 15.500 |
| BLADE PITCH ANGLE-ALL | | 45.0 | 45.0 | 45.0 | 45.0 | 45.0 | 45.0 | 45.0 | 45.0 |
| BLADE OFFSET ANGLE BASED ON MODEL (SEE INSTRUCTIONS BELOW) | | 84 | 82 | 81 | 94 | 68 | 84 | 88 | 100 |

| DESIGN GROUP | DG300/350 | | DG400/500 | | DG600 | DG700 | DG800 |
|---|---|---|---|---|---|---|---|
| MODEL | DA300 | DA350 | DA400 | DA500 | DA600 | DA700 | DA800 |
| STD AGITATOR TYPE | 3 SWEEP | 3 SWEEP | 3 SWEEP | 3 SWEEP | 3 SWEEP | 3 SWEEP | 3 SWEEP |
| BOTTOM RADIUS | 13.000 | 13.000 | 14.000 | 14.000 | 16.000 | 17.000 | 18.000 |
| BOWL INSIDE LENGTH | 52.000 | 58.000 | 58.000 | 69.000 | 69.000 | 69.000 | 74.000 |
| NUMBER OF SWEEPS | 3 | 3 | 3 | 3 | 3 | 3 | 3 |
| HUB TO BOWL END | 1.000 | 1.000 | 1.000 | 1.000 | 1.000 | 1.000 | 1.000 |
| HUB CENTERS | 15.000 | 17.000 | 17.000 | 20.667 | 20.333 | 20.333 | 21.667 |
| BETWEEN HUBS | 10.000 | 12.000 | 12.000 | 15.667 | 14.333 | 14.333 | 14.667 |
| BLADE PITCH ANGLE-ALL | 45.0 | 45.0 | 45.0 | 45.0 | 45.0 | 45.0 | 45.0 |
| BLADE OFFSET ANGLE BASED ON MODEL (SEE INSTRUCTIONS BELOW) | 77 | 88 | 82 | 94 | 86 | 82 | 85 |

TABLE 2

Determination of Agitator Design Standards

| POINT | X | Y | Z | ANGLE FROM VERTICAL | X | Y | Z | ANGLE FROM VERTICAL |
|---|---|---|---|---|---|---|---|---|
| SWEEP PROFILE (Sketch 5) | | | | | | | | |
| CORNER 1-LOWER FRONT | 1.250 | 9.969 | 5.811 | | | | | |
| CORNER 2-LOWER REAR | 2.311 | 9.969 | 4.750 | | | | | |
| CORNER 3-UPPPER FRONT | 1.250 | 17.469 | 5.811 | | | | | |
| CORNER 4-UPPER REAR | 2.311 | 17.469 | 4.750 | | | | | |
| SWEET GUIDE PATH - FIXED (3DSKETCH 1) | OUTSIDE | | | | INSIDE | | | |
| OUTSIDE RIGHT BLADE | 1.780 | 17.469 | 5.280 | | 1.780 | 9.969 | 5.280 | |
| RIGHT BLADE CENTER | −3.500 | 18.250 | 0.000 | | −3.500 | 10.750 | 0.000 | |
| INSIDE RIGHT BLADE | −7.000 | 17.911 | −3.500 | | −7.000 | 10.411 | −3.500 | |
| INSIDE LEFT BLADE | −21.667 | 5.048 | −17.538 | | −21.667 | 4.394 | −10.067 | |
| CENTER LEFT BLADE | −25.167 | 1.591 | −18.181 | | −25.167 | 0.937 | −10.709 | |
| OUTSIDE LEFT BLADE | −30.697 | −3.993 | −17.808 | | −30.697 | −4.647 | −10.336 | |
| OUTSIDE SWEEP GUIDE PATH-CALCULATED | | | | | | | | |
| CALCULATED POINTS | 6 | | | | 6 | | | |
| INSIDE RIGHT BLADE POINT ANGLE | −11.057 | | | | −18.582 | | | |
| TOTAL ANGLE | 62.89 | | | | 47.84 | | | |
| ANGLE PER POINT | 8.98 | | | | 6.83 | | | |
| TOTAL DISTANCE | −14.667 | | | | −14.667 | | | |
| DISTANCE PER POINT | −2.095 | | | | −2.095 | | | |
| SWEEP RADIUS | 18.250 | | | | 10.984 | | | |
| POINT 1 | −9.095 | 17.145 | −6.254 | −20.04 | −9.095 | 9.921 | −4.714 | −25.42 |
| POINT 2 | −11.191 | 15.958 | −8.855 | −29.02 | −11.191 | 9.289 | −5.861 | −32.25 |
| POINT 3 | −13.286 | 14.380 | −11.238 | −38.01 | −13.286 | 8.526 | −6.925 | −39.08 |

TABLE 2-continued

Determination of Agitator Design Standards

| POINT | X | Y | Z | ANGLE FROM VERTICAL | X | Y | Z | ANGLE FROM VERTICAL |
|---|---|---|---|---|---|---|---|---|
| POINT 4 | −15.381 | 12.448 | −13.345 | −46.99 | −15.381 | 7.641 | −7.890 | −45.92 |
| POINT 5 | −17.476 | 10.212 | −15.126 | −55.98 | −17.476 | 6.648 | −8.743 | −52.75 |
| POINT 6 | −19.572 | 7.725 | −16.535 | −64.96 | −19.572 | 5.560 | −9.472 | −59.59 |

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. An agitator assembly, comprising:
   (a) at least two rotating agitators, wherein each rotating agitator includes:
      (i) an agitator shaft, wherein the agitator shaft defines an axis of rotation extending from a first end of the agitator shaft to a second end of the agitator shaft; and
      (ii) first, second, and third sweep blades mounted on the agitator shaft, wherein the pitch angle of each sweep blade relative to the axis of rotation of the agitator shaft is between 30-60°, and wherein the third sweep blade includes a first section that is oriented with a forward sweep directionality and a second section that is oriented with a reverse sweep directionality; and
   (b) wherein the rotating agitators are adapted to rotate in opposite directions relative to one another.

2. The agitator assembly of claim 1, wherein the pitch angle of each sweep blade relative to the axis of rotation of the agitator shaft is fixed at 45°.

3. The agitator assembly of claim 1, wherein the agitator assembly is adapted for use in a mixing bowl, and wherein the mixing bowl is a component of a large-scale industrial mixer.

4. The agitator assembly of claim 1, wherein the first sweep blade is oriented on the agitator shaft with a forward sweep directionality.

5. The agitator assembly of claim 1, wherein the second sweep blade is oriented on the agitator shaft with a forward sweep directionality.

6. The agitator assembly of claim 1, wherein the length of each sweep blade is between about 20 inches and about 74 inches.

7. The agitator assembly of claim 1, wherein the diameter of each sweep blade is between about 7 inches and about 36 inches.

8. An agitator assembly, comprising:
   (a) at least two rotating agitators, wherein each rotating agitator includes:
      (i) an agitator shaft, wherein the agitator shaft defines an axis of rotation extending from a first end of the agitator shaft to a second end of the agitator shaft;
      (ii) first, second, third, and fourth hubs mounted on the agitator shaft at predetermined locations, wherein the distances between the first and second hub, the second and third hub, and third and fourth hub are substantially equal;
      (iii) a first sweep blade mounted between the first hub and second hub;
      (iv) a second sweep blade mounted between the second hub and third hub; and
      (v) a third sweep blade mounted between the third and third and fourth hub, wherein the third sweep blade includes a first section that is oriented with a forward sweep directionality and a second section that is oriented with a reverse sweep directionality; and
   (b) wherein the pitch angle of each sweep blade relative to the axis of rotation of the agitator shaft is between 30-60°,
   (c) wherein the rotating agitators rotate in opposite directions relative to one another when in use, and
   (d) wherein the agitator assembly is adapted for use in a mixing bowl.

9. The agitator assembly of claim 8, wherein the pitch angle of each sweep blade relative to the axis of rotation of the agitator shaft is fixed at 45°.

10. The agitator assembly of claim 8, wherein the mixing bowl is a component of a large-scale industrial mixer.

11. The agitator assembly of claim 8, wherein the first sweep blade is oriented on the agitator shaft with a forward sweep directionality.

12. The agitator assembly of claim 8, wherein the second sweep blade is oriented on the agitator shaft with a forward sweep directionality.

13. The agitator assembly of claim 8, wherein the length of each sweep blade is between about 20 inches and about 74 inches.

14. The agitator assembly of claim 8, wherein the diameter of each sweep blade is between about 7 inches and about 36 inches.

15. An agitator assembly, comprising:
   (a) at least two rotating agitators, wherein each rotating agitator includes:
      (i) an agitator shaft, wherein the agitator shaft defines an axis of rotation extending from a first end of the agitator shaft to a second end of the agitator shaft;
      (ii) first, second, third, and fourth hubs mounted on the agitator shaft at predetermined locations, wherein the distances between the first and second hub, the second and third hub, and third and fourth hub are substantially equal;
      (iii) a first sweep blade mounted between the first hub and second hub, wherein the first sweep blade is oriented with a forward sweep directionality;
      (iv) a second sweep blade mounted between the second hub and third hub, wherein the second sweep blade is oriented a forward sweep directionality; and (v) a third sweep blade mounted between the third and third and fourth hub, wherein the third sweep blade includes a first section that is oriented with a forward sweep directionality and a second section that is oriented with a reverse sweep directionality;
(b) wherein the pitch angle of each sweep blade relative to the axis of rotation of the agitator shaft is fixed at 45°,
(c) wherein the rotating agitators rotate in opposite directions relative to one another when in use,
(d) wherein the agitator assembly is adapted for use in a mixing bowl, and
(e) wherein the mixing bowl is a component of a large-scale industrial mixer.

16. The agitator assembly of claim 15, wherein the length of each sweep blade is between about 20 inches and about 74 inches.

17. The agitator assembly of claim 15, wherein the diameter of each sweep blade is between about 7 inches and about 36 inches.

18. The agitator assembly of claim 15, wherein the at least two rotating agitators are manufactured from stainless steel.

\* \* \* \* \*